(12) United States Patent
Wei et al.

(10) Patent No.: US 7,861,092 B2
(45) Date of Patent: Dec. 28, 2010

(54) PERSONAL COMMUNICATION APPARATUS CAPABLE OF RECORDING TRANSACTIONS SECURED WITH BIOMETRIC DATA

(75) Inventors: Gongming Wei, Shanghai (CN); Feng Li, Shanghai (CN); Steven Broeils Luitjens, Eindhoven (NL); Darwin He, Shanghai (CN); Wenying You, Shanghai (CN); Wilhelmus Franciscus Johannes Fontijn, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 1083 days.

(21) Appl. No.: 11/568,703

(22) PCT Filed: May 4, 2005

(86) PCT No.: PCT/IB2005/051452

§ 371 (c)(1),
(2), (4) Date: Nov. 6, 2006

(87) PCT Pub. No.: WO2005/109734

PCT Pub. Date: Nov. 17, 2005

(65) Prior Publication Data

US 2007/0226511 A1    Sep. 27, 2007

(30) Foreign Application Priority Data

May 10, 2004    (EP)    ................................. 04102012

(51) Int. Cl.
G06F 21/00    (2006.01)
(52) U.S. Cl. ............................ 713/186; 726/26; 726/34; 726/4; 726/5; 726/7; 380/258; 380/255; 705/65; 705/66; 705/67; 705/68; 705/69
(58) Field of Classification Search .................. 713/186
See application file for complete search history.

(56) References Cited

U.S. PATENT DOCUMENTS

| | | | |
|---|---|---|---|
| 5,574,789 A | 11/1996 | Nakamura et al. | |
| 6,091,835 A * | 7/2000 | Smithies et al. | ............. 382/115 |
| 2002/0010857 A1 | 1/2002 | Karthik | |
| 2002/0031209 A1* | 3/2002 | Smithies et al. | ........... 379/93.12 |
| 2002/0107816 A1* | 8/2002 | Craig et al. | .................... 705/78 |
| 2003/0007640 A1 | 1/2003 | Harada et al. | |
| 2003/0032448 A1 | 2/2003 | Bulthuis et al. | |
| 2003/0135740 A1* | 7/2003 | Talmor et al. | ................ 713/186 |

(Continued)

FOREIGN PATENT DOCUMENTS

CA    2375165 A1    9/2003

(Continued)

*Primary Examiner*—Minh Dieu Nguyen
*Assistant Examiner*—Mahfuzur Rahman (57) ABSTRACT

A personal communication apparatus is presented for generating a verifiable recording of a transaction, the transaction comprising an exchange of information. The apparatus includes a receiving component, a protection component, a memory and a recording component. The receiving component receives a transaction between a user of the apparatus and a remote person, and of receiving biometric data (BIOKY) of the remote person. The protection component protects the voice conversation with the biometric data (BIOKY). The recording component records the transaction protected with the biometric data on the memory. A communication apparatus is also presented that includes a memory and an authentication component. The authentication component provides access to a protected transaction stored on the memory.

8 Claims, 7 Drawing Sheets

U.S. PATENT DOCUMENTS

| | | |
|---|---|---|
| 2003/0145211 A1 | 7/2003 | Fukawa |
| 2004/0208316 A1* | 10/2004 | Wack et al. ................ 380/44 |
| 2005/0027543 A1* | 2/2005 | Labrou et al. ................ 705/1 |
| 2008/0267404 A1* | 10/2008 | Budde et al. ................ 380/270 |

FOREIGN PATENT DOCUMENTS

| | | | |
|---|---|---|---|
| JP | 07044464 | | 2/1995 |
| JP | 2005092614 A | * | 4/2005 |
| WO | WO0143338 A1 | | 6/2001 |
| WO | WO0163386 A1 | | 8/2001 |
| WO | WO0171671 A2 | | 9/2001 |
| WO | WO0247080 A2 | | 6/2002 |
| WO | WO02054341 A1 | | 7/2002 |
| WO | WO03034651 A1 | | 4/2003 |
| WO | WO03067811 A1 | | 8/2003 |

\* cited by examiner

PROC2:

PERSONAL COMMUNICATION APPARATUS CAPABLE OF RECORDING TRANSACTIONS SECURED WITH BIOMETRIC DATA

FIELD OF THE INVENTION

The invention relates to a personal communication apparatus for generating verifiable data files. The invention also relates to a personal communication apparatus for verifying authenticity of data files. The invention further relates to software executable on a computing means to make the computing means capable of functioning as a personal communication apparatus for generating verifiable data files and/or for verifying authenticity of data files.

BACKGROUND OF THE INVENTION

Authentication of data files and data transfer processes is well known and of crucial importance in commerce, for example, with regard to transactions in electronic banking systems. In these banking systems, it is important to know whether or not a request to transfer money from one bank account to another is fraudulent. These transactions can potentially take the form of agreements which are often legally binding on parties involved. Similar considerations also pertain to agreements made by e-mail communication and increasingly also oral agreements. When oral agreements are made via electronic communication media, for example, via mobile telephones, authentication of the person speaking is of importance. If a given speaker can be identified unambiguously, a recording of the speaker can be potentially irrefutably verified as being authentic.

Published United States patent no. US2002/0107816 describes a method and system for securely recording an oral transaction. The method includes the steps of:

a) recording an offer and acceptance of the transaction as a digital audio file;

b) generating a voice security token from the recorded digital audio file; and c) providing the generated voice security token to buyer and seller.

The voice security token has the benefit that it provides authentication of the transaction.

OBJECT AND SUMMARY OF THE INVENTION

The inventors have appreciated that voice/audio recordings can be very personal and private entities. For example, a voice recording pertaining to private matters potentially falling in the hands of a blackmailer can be used to extract money from a person generating the voice recording. However, the inventors have also envisaged that portable communication devices, for example, mobile handset telephones, will in future be equipped with considerable amounts of data storage capacity, for example, in the form of miniature optical data storage media and associated read/write drives incorporated into such communication devices. In a manner akin to e-mail communication systems, where earlier e-mail messages are stored and archived for potential later reference, it is envisaged that similar modes of operation will pertain to future mobile telephones. Thus, future mobile telephones will potentially include relatively large capacity memories of, for example, 1 Gbyte or more, including removable data carriers; for example, in future applications, mobile telephone users can potentially build complete libraries of past telephone conversations, in a manner similar to collections of written correspondence, letters and so forth. A personal communication device capable of recording a voice conversation is known from patent US2003/0032448 ('logbook emulet'), incorporated herein by reference. Authenticity and security of past-recorded conversations recorded on data carriers is thus desirable and therefore addressed by the present invention.

It is an object of the invention to provide a personal communication apparatus for authenticating transactions, for example, voice conversations.

According to a first aspect of the invention, a personal communication apparatus is provided for generating a verifiable recording of a transaction, the transaction comprising an exchange of information, the apparatus including:

a) a receiving component for receiving a transaction between a user of the apparatus and a remote person, and for receiving biometric data of the remote person;

b) a protection component for protecting the transaction with the biometric data;

c) a memory for storing the protected transaction; and d) a recording component for recording the transaction protected with the biometric data on the memory.

The invention is advantageous in that unauthorized third parties having incompatible biometric data are not able to decrypt the transaction and therefore do not have access to its content. In addition, if a third party is able to decrypt the transaction, it is proof that this party was a participant in the transaction. Biometric data cannot be easily forged and/or lost. A transaction may be, for example, a voice conversation, a video communication, or a written message. The personal communication apparatus may be, for example, a mobile phone or an add-on for a mobile phone. An add-on for a mobile phone may be physically attached to the mobile phone or may communicate with the mobile phone by using wireless technology, e.g. Bluetooth.

In the personal communication apparatus, the protection component is preferably capable of protecting the transaction with the biometric data by generating one or more access keys (RANKY), encrypting the transaction with the one or more access keys (RANKY), protecting the one or more access keys with the biometric data, and storing the protected one or more access keys in the memory. In this case, multiple persons can be allowed access to a single transaction without requiring the transaction to be encrypted more than once. This is especially advantageous if a transaction consists of a large data file, e.g. a voice conversation or a video communication.

In the personal communication apparatus, the memory preferably comprises a keylocker and the protection component is capable of storing the protected one or more access keys in the memory by storing the one or more access keys (RANKY) together with the biometric data in the keylocker. Digital rights management (DRM) systems often use a keylocker to store keys, i.e. digital rights. In these systems, a keylocker is also known as a (digital) rights locker. Only trusted DRM applications are allowed access to the keys stored in the keylocker.

In the personal communication apparatus, the protection component is preferably capable of protecting the one or more access keys with the biometric data by encrypting the one or more access keys (RANKY), using a biometric key (BIOKY) to generate one or more security keys (ENCKY) for use in accessing the protected voice conversation, the biometric key (BIOKY) corresponding to or being generated from the biometric data.

In the personal communication apparatus, the receiving component is preferably capable of receiving biometric data from a biometric measuring means which includes one or more from: fingerprint imaging of one or more digits of a human hand, analysis of phonetic content of a vocal utterance, facial imaging followed by image analysis, human iris image analysis, dental imaging, or ear contour analysis.

According to a second aspect of the invention, a personal communication apparatus is provided, which is operable to support authentication of a transaction therein, the transaction comprising an exchange of information, and characterized in that the apparatus includes:

a) a memory for storing a transaction protected with earlier biometric data; and b) an authentication component for providing access to the protected transaction if biometric data measured by a biometric measuring means corresponds to the earlier biometric data.

In the personal communication apparatus, the authentication component is preferably capable of providing one or more access keys (RANKY) for decrypting the protected transaction, provided that the biometric data correspond to the earlier biometric data, and the personal communication apparatus preferably further includes a decrypting component for using the one or more access keys (RANKY) to decrypt at least part of the protected transaction.

In the personal communication apparatus, the authentication component is preferably capable of obtaining the one or more verified access keys (RANKY) by decrypting one or more security keys (ENCKY) with one or more measured biometric keys (BIOKY).

In the personal communication apparatus, the one or more access keys are preferably maintained in a keylocker associated therein with earlier biometric data, such that presentation of the measured biometric data to the keylocker enables access, subject to the earlier biometric data in the keylocker corresponding to the measured biometric data, to the one or more access keys (RANKY).

In the personal communication apparatus, the authentication component is preferably capable of receiving biometric data from a biometric measuring means which includes one or more from: fingerprint imaging of one or more digits of a human hand, analysis of phonetic content of a vocal utterance, facial imaging followed by image analysis, human iris image analysis, dental imaging, or ear contour analysis.

It will be appreciated that features of the invention are susceptible to any combination without departing from the scope of the invention.

BRIEF DESCRIPTION OF THE DRAWINGS

Embodiments of the invention will now be described, by way of example only, with reference to the following drawings, wherein.

DESCRIPTION OF EMBODIMENTS

Figure 1:
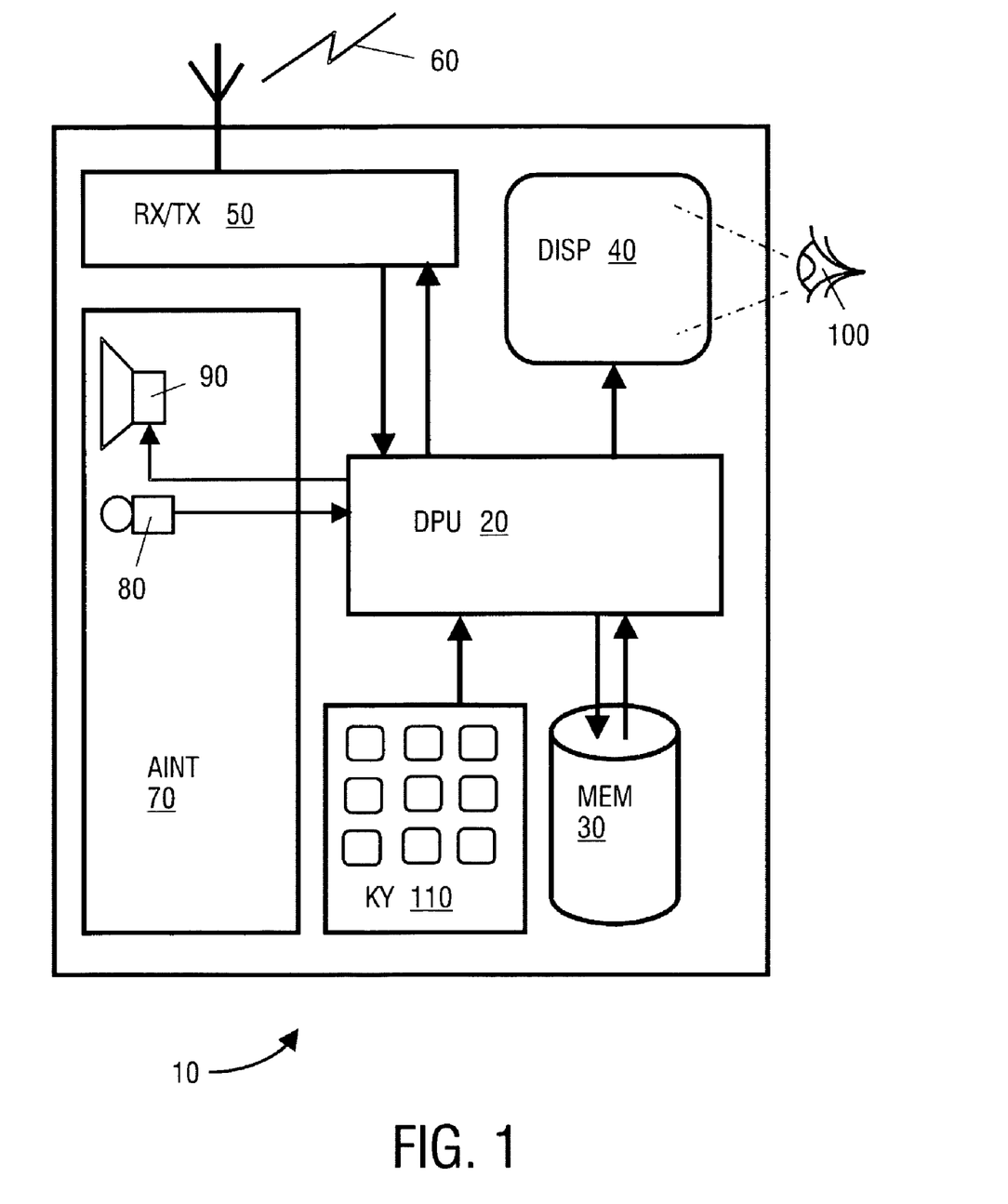
FIG. 1 is a schematic diagram of a personal communication apparatus according to the invention.

An overview of the invention will be provided with reference to FIG. 1. In FIG. 1, a personal communication apparatus, for example, a mobile telephone, is denoted generally by the reference numeral 10. The apparatus 10 includes a data-processing unit (DPU) 20 coupled to a data memory (MEM) 30; the processing unit 20 comprises one or more computing devices for executing software. The apparatus 10 further comprises a display device (DISP) 40, for example, a miniature thin-film-transistor (TFT) liquid crystal display (LCD), coupled to the processing unit 20. Moreover, the apparatus 10 comprises a radio transceiver (RX/TX) 50 connected to the processing unit 20 for transmitting and receiving wireless communications 60. Furthermore, the apparatus 10 includes an audio interface (AINT) 70 coupled to the processing unit 20; the interface 70 comprises a microphone 80 and also a miniature loudspeaker or piezo-electric element 90. The microphone 80 and loudspeaker/element 90 are used for sensing speech of a user 100 and also for generating sound for the user 100 to hear, respectively. A keypad (KY) 110 for data entry to the processing unit 20 is also included. The memory 30 is preferably implemented with a removable data carrier, most preferably at least one of a read/writable magnetic data carrier and an optical data carrier such as a SFFO optical disc as employed in Philips' proprietary optical memory system "Portable Blue". The processing unit 20 is also preferably coupled to a local memory, for example, a non-volatile read-only-memory (ROM) for storing a software operating system and one or more specific software applications for execution on the processing unit 20. The one or more specific software applications may perform the following functions:

a receiving function of using the radio transceiver 50 to receive a voice conversation between a user 100 of the apparatus and a remote person, and to receive biometric data of the remote person;

a protection function of protecting the voice conversation with the biometric data;

a recording function of recording the voice conversation 240 protected with the biometric data on the memory 30.

Figure 2:
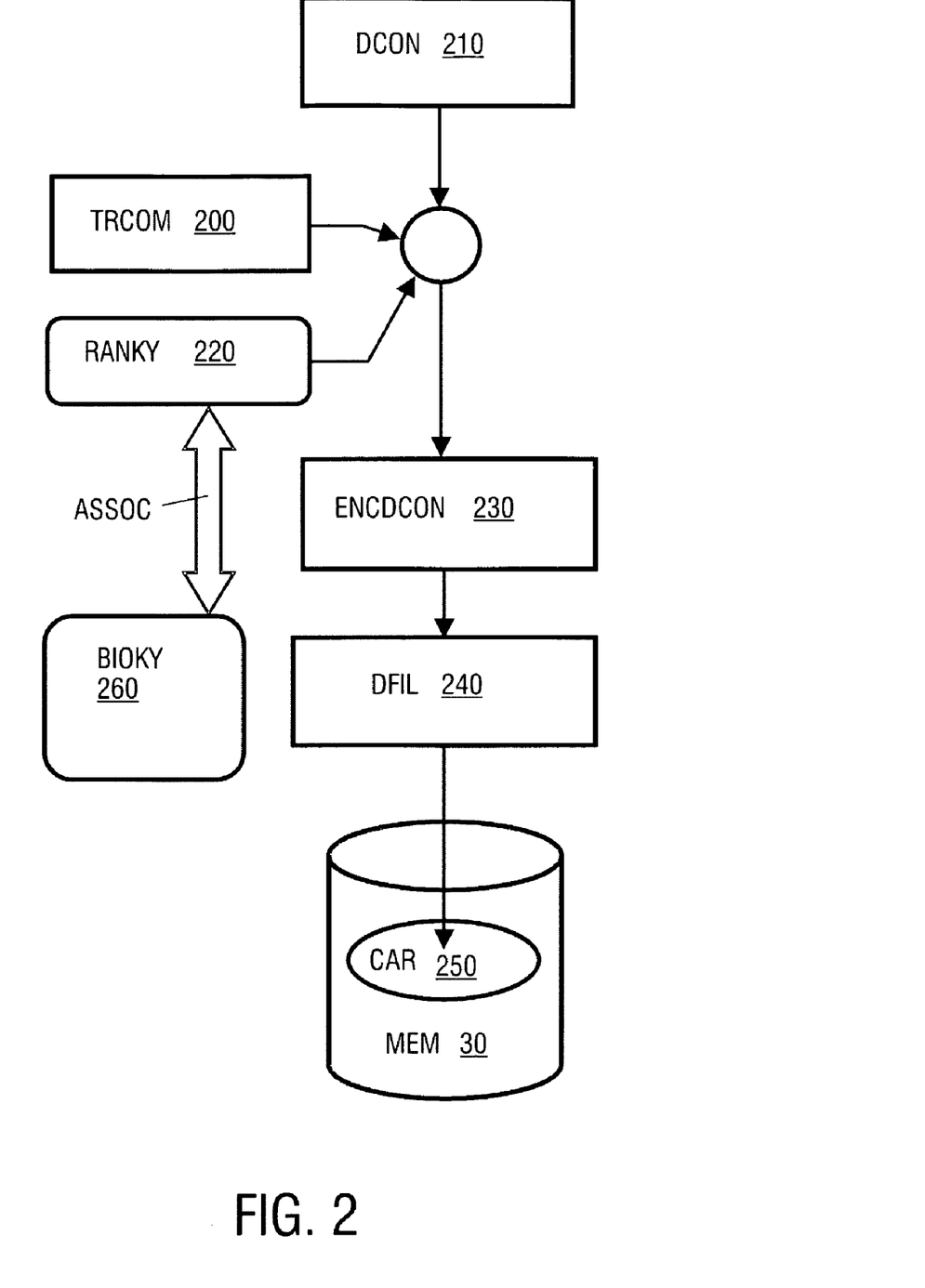
FIG. 2 is a flow chart relating to a method of encrypting data content (DCON) by applying a trusted component (TRCOM) utilizing a random key (RANKY) having one or more associated biometric keys (BIOKY) to generate encrypted data (ENCDCON) for storage as a data file (DFIL) on a data carrier (CAR) in a memory device (MEM)

Alternatively or additionally, the one or more specific software applications may perform an authentication function of providing access to the voice conversation 240 protected with earlier biometric data and stored on the memory 30 if biometric data measured by a biometric measuring means 80 corresponds to the earlier biometric data. One of these software applications is preferably a trusted component whose operation will be described in more detail hereinafter. Alternatively to implementing the trusted component as an executable software application, it can be implemented at least in part as specific processing hardware, for example, in the form of an application specific integrated circuit (ASIC) incorporated into the apparatus 10, the ASIC providing functionality which is extremely difficult for third parties to copy Operation of the apparatus 10 will now be described with reference to FIGS. 1 and 2. The trusted component (TRCOM), denoted by 200 in FIG. 2, is used as a protection component to encrypt data content (DCON) 210 corresponding to a conversation or oral transaction by processing the data content 210, using a random encryption key (RANKY) 220 to generate corresponding encrypted data content (ENCDCON) 230. Subsequently, the encrypted data content (ENCDCON) 230 is stored as a data file (DFIL) 240 on a data carrier (CAR) 250 of the memory 30 by the recording component. The trusted component (TRCOM) 200 is employed to associate (ASSOC) one or more biometric keys (BIOKY) 260 of each participant involved in the conversation or oral transaction with the random key (RANKY) 220. Such an association (ASSOC) can be implemented by means of first or second procedures, as will now be described.

Figure 3:
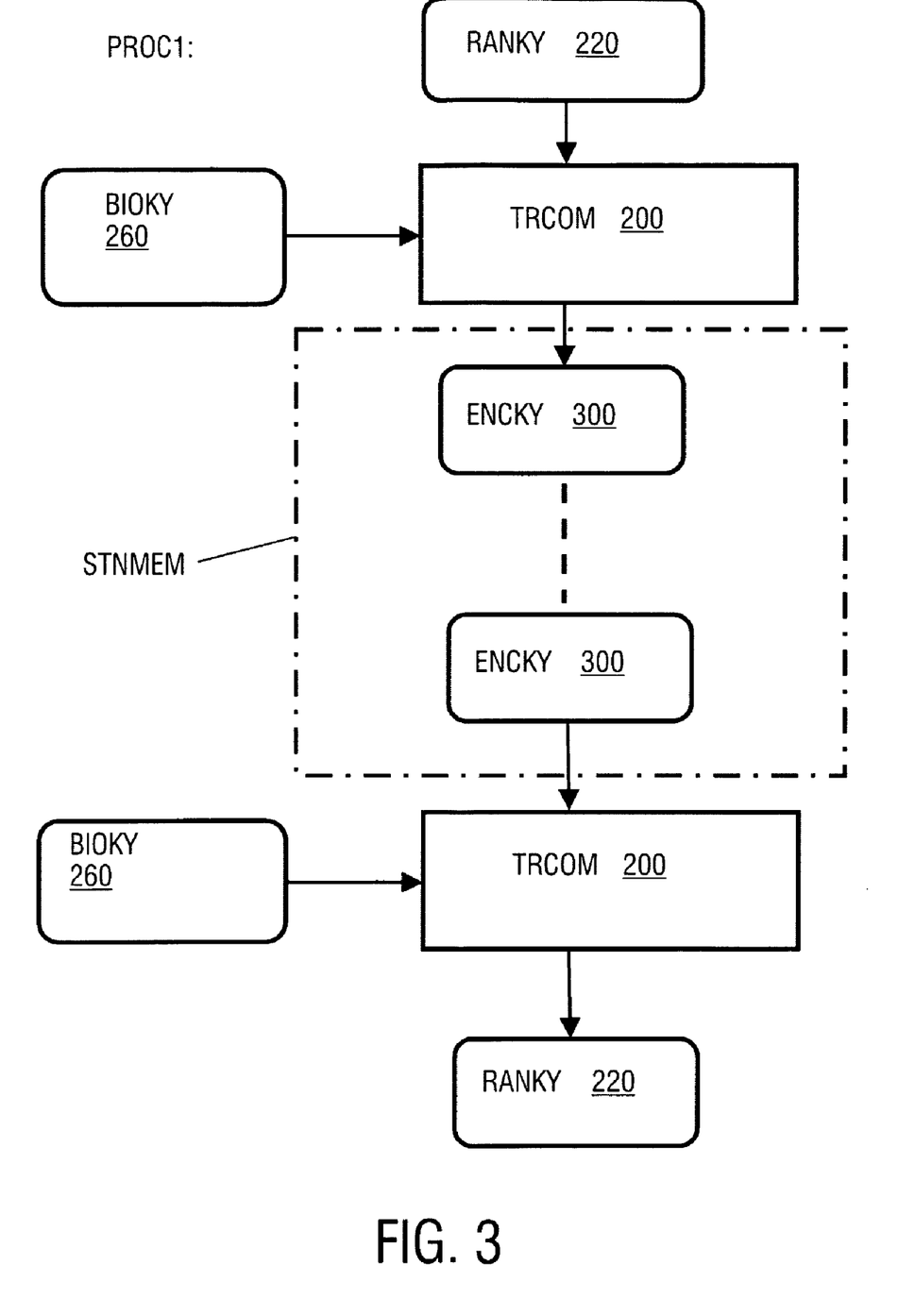
FIG. 3 is a representation of a first procedure for use in the method depicted in FIG. 2.

In the first procedure (PROC1) depicted in FIG. 3, the trusted component (TRCOM) 200 securely receives the one or more biometric keys (BIOKY) 260. The component (TRCOM) 200 is able to encrypt the aforementioned random key (RANKY) 220 to generate a corresponding encrypted random key (ENCKY) 300, which encryption utilizes the one or more biometric keys (BIOKY) 260. Moreover, the component (TRCOM) 200 is also able to act as an authentication component to decrypt the encrypted random key (ENCKY) 300 with any one of the one or more biometric keys (BIOKY) 260. Only the encrypted random key (ENCKY) 300 is eventually stored in the memory (MEM) 30 shown in FIG. 1. The first procedure (PROC1) has the benefit that it is not necessary for the encrypted random key (ENCKY) 300 to be stored in a secure memory, for example, in a "keylocker" for achieving enhanced security; namely, the encrypted random key (ENCKY) 300 can be stored in a standard memory (STNMEM), which is not necessarily designated as "keylocker" memory, while yet maintaining security.

Figure 4:
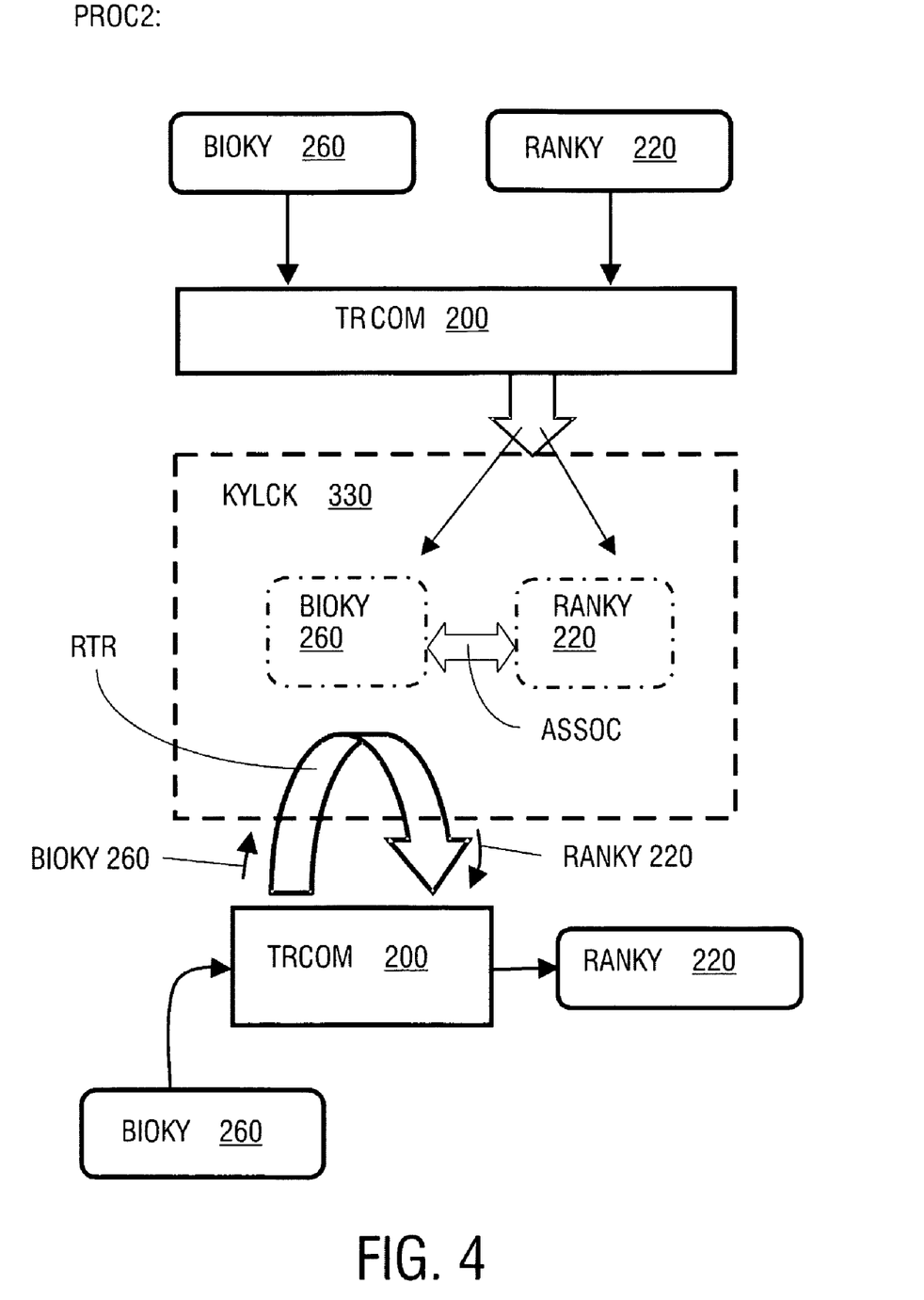
FIG. 4 is a representation of a second procedure for use in the method depicted in FIG. 2.

In the second procedure (PROC2) depicted in FIG. 4, the trusted component (TRCOM) 200, acting as a protection component, securely receives the one or more biometric keys (BIOKY) 260 and then stores them securely in a keylocker (KYLCK) 330 together with the random key (RANKY) 220. The keylocker (KYLCK) 330 is a secure storage facility for storing keys. Moreover, the trusted component (TRCOM) 200 is also capable of associating (ASSOC) the random key (RANKY) 220 with the one or more biometric keys (BIOKY) 260 stored in the keylocker (KYLCK) 330. The trusted component (TRCOM) 200 is operable only to retrieve (RTR) a random key, for example, the random key (RANKY) 220, from the keylocker (KYLCK) 330 if the component (TRCOM) 200 is able to supply to the keylocker (KYLCK) 330 any one of the one or more biometric keys (BIOKY) 260 corresponding to the random key (RANKY) 220 stored in the keylocker (KYLCK) 330.

Recovery of the random key (RANKY) 220 enables the data file (DFIL) 240 to be authenticated, for example, by allowing the file (DFIL) 240 to be decrypted, using the random key (RANKY) 260.

The inventors have appreciated that the use of biometric keys is important to implement the method of the invention for achieving authentication. "Biometric" is to be interpreted as "measurement of some biological feature", for example, one or more of:

a) characteristic voice phonetic details;

b) facial spatial feature details, such as aspect ratio of nose, mouth to forehead;

c) fingerprint details;

d) iris details;

e) dental details, such as spatial aspect ratio of front incisor teeth; and f) ear (pinna) spatial profile details, but is not limited to these examples. The use of phonetic voice details is most preferred on account of the apparatus 10 already including a microphone 80 to transduce the user's 100 voice and processing capacity in the data-processing unit (DPU) 20 to execute necessary voice signal data processing to extract corresponding biometric parameters and thereby derive the biometric keys (BIOKY) 260 when the authentic user 100 is using the apparatus 10. Beneficially, the apparatus 10 includes a miniature digital camera coupled to the data-processing unit (DPU) 20 for generating the biometric keys (BIOKY) 260. Biometric keys have the advantage that they are an inseparable part of the user 100 and hence are not susceptible to being easily copied or lost. However, the current popularity of plastic surgery can render biometric authentication potentially less reliable, for example, facial details are susceptible to being modified by face lifts, lip implants, rhinoplasty, blepharoplasty and/or cranial orbital bone grind. Moreover, fingerprints are susceptible to being modified by scarring events (lesions), skin surface abrasion and skin grafts. However, problems associated with using such biometrics can be alleviated by using more than one biometric key for each user, for example, by using a fingerprint-derived key in combination with an iris-derived key. Measurement of each biometric key is not required whenever such a plurality of biometric keys is employed, because a keylocker can be configured to store associations of one biometric key with another.

The random key (RANKY) 220 is preferably dynamically altered from one sound recording to another so that not all recordings are compromised if one random key (RANKY) 220 relating to files stored in the memory (MEM) 30 is discovered by a third party. A temporal starting instance of a sound recording to be stored in the memory (MEM) 30 can be beneficially used as a random seed for generating the random key (RANKY) 220. Alternatively, spatial location of the apparatus 10 when recording a conversation in the memory (MEM) 30, for example, as determined by the apparatus 10 receiving geographical co-ordination references from the nearest mobile telephone radio mast, is also susceptible to being used as a seed for generating the random key (RANKY) 220. As a further alternative, a combination of temporal and geographical input can be used to generate the random key (RANKY) 220.

The random key (RANKY) 220 is preferably applied by the processing unit (DPU) 20 to encrypt a conversation from the user 100 in real time so that a partially unencrypted file is not inadvertently recorded in the memory (MEM) 30. When completing a conversation using the apparatus 10, the apparatus 10 preferably prompts the remote person, and optionally the user 100, to input his unique access key, for example, the remote person's fingerprint, the remote person's utterance of a reference phrase for phonetic authentication, or a view of the remote person's face, for example, for purposes of generating the biometric key (BIOKY) 260.

In a situation where a remote person wants to access one of the recordings stored in the memory (MEM) 30, for example, by telephoning to the user 100 where the user 100 has recorded a transaction in the memory (MEM) 30, the remote person can potentially access the recording, provided that the remote user has a biometric key included within the one or more biometric keys (BIOKY) 260. The biometric key from the remote person can potentially be sent as an encrypted mobile telephone message from the remote person to the apparatus 10. The apparatus 10 can be arranged to support several biometric keys for multiple remote persons for accessing conversations of the user 100 stored in the memory (MEM) 30.

When the user 100 wants to refer back to an earlier conversation recorded by the apparatus 10 in its memory (MEM) 30, the apparatus 10 is preferably programmed in such a way that its processing unit (DPU) 20 reminds the user 100 of presenting his biometric parameter, for example, by offering a finger to the apparatus for fingerprint reading, or by uttering a special phrase which the processing unit 20 is operable to analyze, for example, by way of temporal spectral analysis, the apparatus 10 thereby being able to derive a biometric parameter for generating a biometric key to allow the user 100 access to a data file stored in the memory (MEM) 30 corresponding to the conversation.

Figure 5:
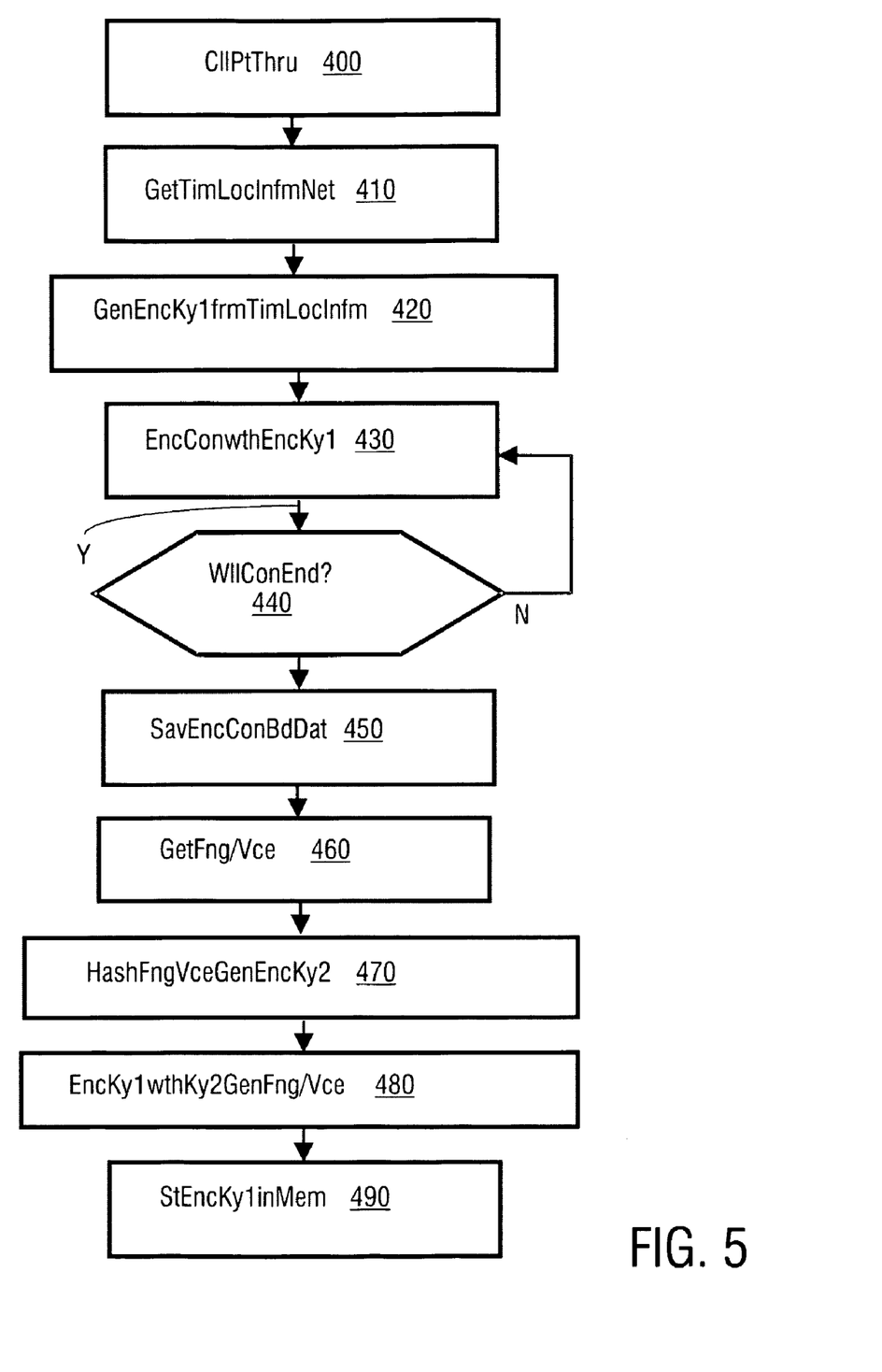
FIG. 5 is a flow chart of steps for recording a conversation within the apparatus of FIG. 1.

FIG. 5 is a flow chart of a method, proposed by the inventors, for recording conversation onto a mobile data medium. Mnemonics and method steps are to be interpreted with reference to Table 1.

TABLE 1

| Step | Mnemonic | Interpretation |
| --- | --- | --- |
| 400 | CllPtThru | Call is put through |
| 410 | GetTimLocInfmNet | Get time/location information from network |
| 420 | GenEncKy1frmTimLocInfm | Generate encryption key Key 1 from the time/location information |
| 430 | EncConwthEncKy1 | Encrypt the conversation with the encryption key Key 1 |
| 440 | WllConEnd? | Will the conversation end? |
| 450 | SavEncConBdDat | Save end encrypted conversation body data to memory (MEM) 30 |
| 460 | GetFng/Vce | Get fingerprint via embedded fingerprint scanner in the apparatus 10 or voice fingerprint via the apparatus 10 itself; if required, a remote speaker can also send his scanned fingerprint/voice fingerprint via a wireless network |
| 470 | HashFngVceGenEncKy2 | Hash the fingerprint/voice fingerprint to generate an encryption key Key 2 |
| 480 | EncKy1wthKy2GenFng/Vce | Encrypt the Key 1 using the Key 2 to generate corresponding encrypted Key 1 |
| 490 | StEncKy1inMem | Store the encrypted Key 1 in the memory (MEM) 30 |

In a step 400, a telephone call is connected through from the apparatus 10 to a communication network. Thereafter, in a step 410, the apparatus 10 is supplied from the communication network with at least one of time-of-call information and geographical location information to act as a seed for generating the random encryption key (RANKY) 220. Subsequently, in a step 420, the processing unit (DPU) 20 generates the random key (RANKY) 220, namely Key 1, from at least one of the time-of-call and the location information. In a step 430, the apparatus 10 assimilates the call while the user 100 is generating it and encrypts it in real time. Thereafter, in a step 440, the apparatus 10 checks whether or not the call has ended. If the call has not yet ended, the apparatus 10 continues executing the step 430. Conversely, if the call is found to have ended in step 440, the apparatus 10 progresses to a step 450 wherein the processing unit (DPU) 20 is operable to save an encrypted body of the conversation onto the data carrier (CAR) 250 in the memory (MEM) 30. In a step 460, the apparatus 10 obtains a biometric fingerprint, for example, an image of an actual fingerprint derived via an embedded fingerprint scanner included within the apparatus 10 and connected to the processing unit (DPU) 20, or a biometric analysis "fingerprint" of an acoustic voice signal obtained, using the microphone 80. Additionally, or alternatively, the apparatus 10 receives one or more remote fingerprints from a remote speaker via the communication network. Moreover, in a step 470, the fingerprint is processed to generate the one or more biometric keys (BIOKY) 260, namely Key 2. Furthermore, in a subsequent step 480, the random key (RANKY) 220, namely key 1, is encrypted with the one or more biometric keys (BIOKY) 260 to generate a corresponding encrypted key (ENCKY) 300. Finally, in a step 490, the apparatus 10 stores its encrypted key (ENCKY) 300 in the memory (MEM) 30. The flow chart in FIG. 5 thus utilizes the aforementioned first procedure (PROC1).

Figure 6:
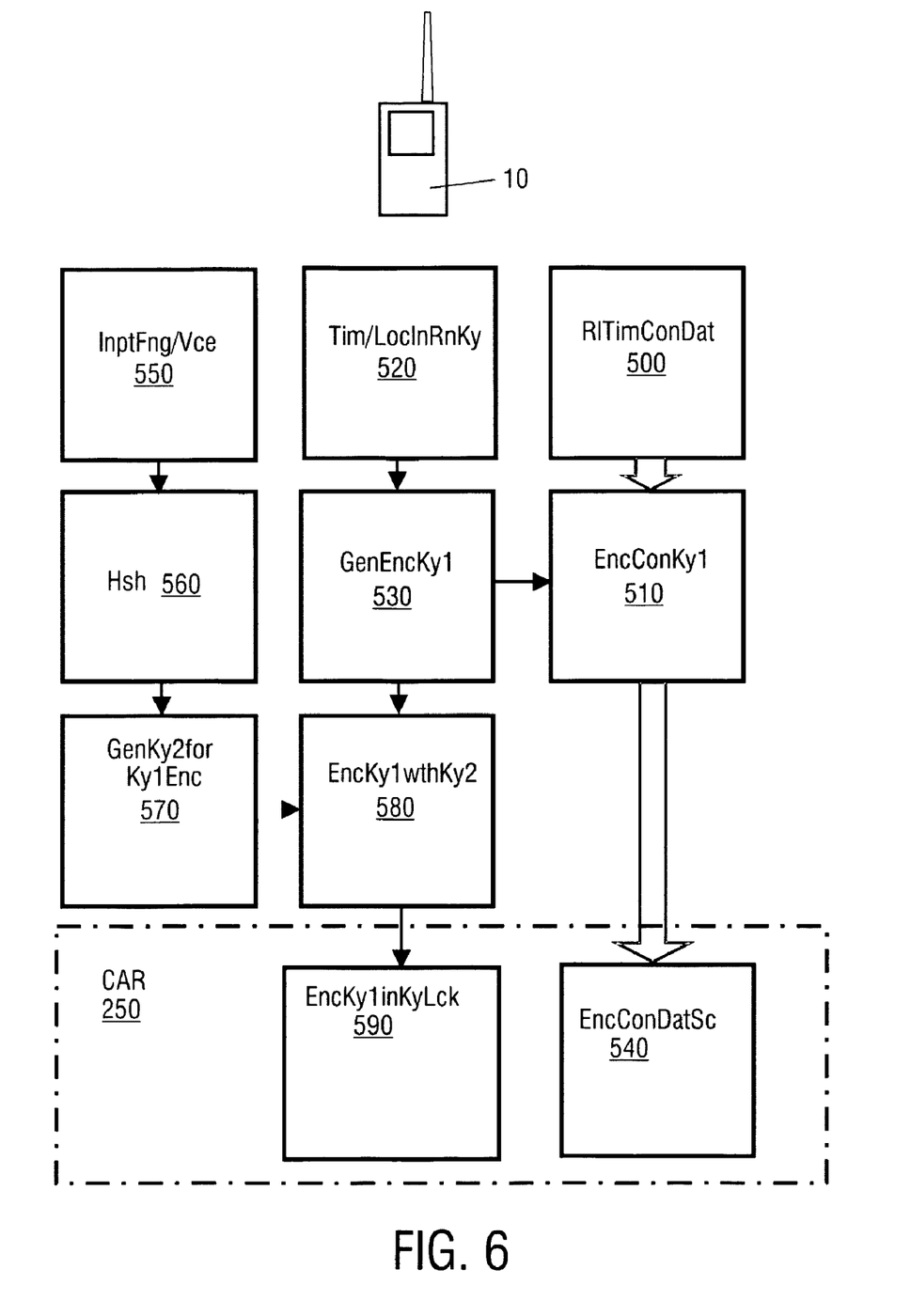
FIG. 6 is an illustration of a key hierarchy for conversation recording in a memory of the apparatus of FIG. 1 utilizing the first procedure (PROC1) shown graphically in FIG. 3.

FIG. 6 illustrates a key hierarchy for conversation recording in the memory (MEM) 30 in accordance with the first procedure (PROC1) shown graphically in FIG. 3. Mnemonics used in FIG. 6 have the same meanings as in Table 2.

TABLE 2

| Step | Mnemonic | Interpretation |
| --- | --- | --- |
| 500 | RlTimConDat | Real time conversation data |
| 510 | EncConKy1 | Encrypt the conversation with Key 1 (RANKY) |
| 520 | Tim/LocInRnKy | Time/Location Information/Random Key |
| 530 | GenEncKy1 | Generate encryption key Key 1 (RANKY) |
| 540 | EncConDatSc | Encrypted conversation data sector |
| 550 | InptFng/Vce | Input fingerprint/voice "fingerprint" |

TABLE 2-continued

| Step | Mnemonic | Interpretation |
| --- | --- | --- |
| 560 | Hsh | Hash function |
| 570 | GenKy2forKy1Enc | Generate biometric key (BIOKY), namely Key 2 |
| 580 | EncKy1wthKy2 | Encrypt Key 1 with Key 2 |
| 590 | EncKy1inKyLck | Encrypted Key 1 stored (for example, in keylocker) |

Figure 7:
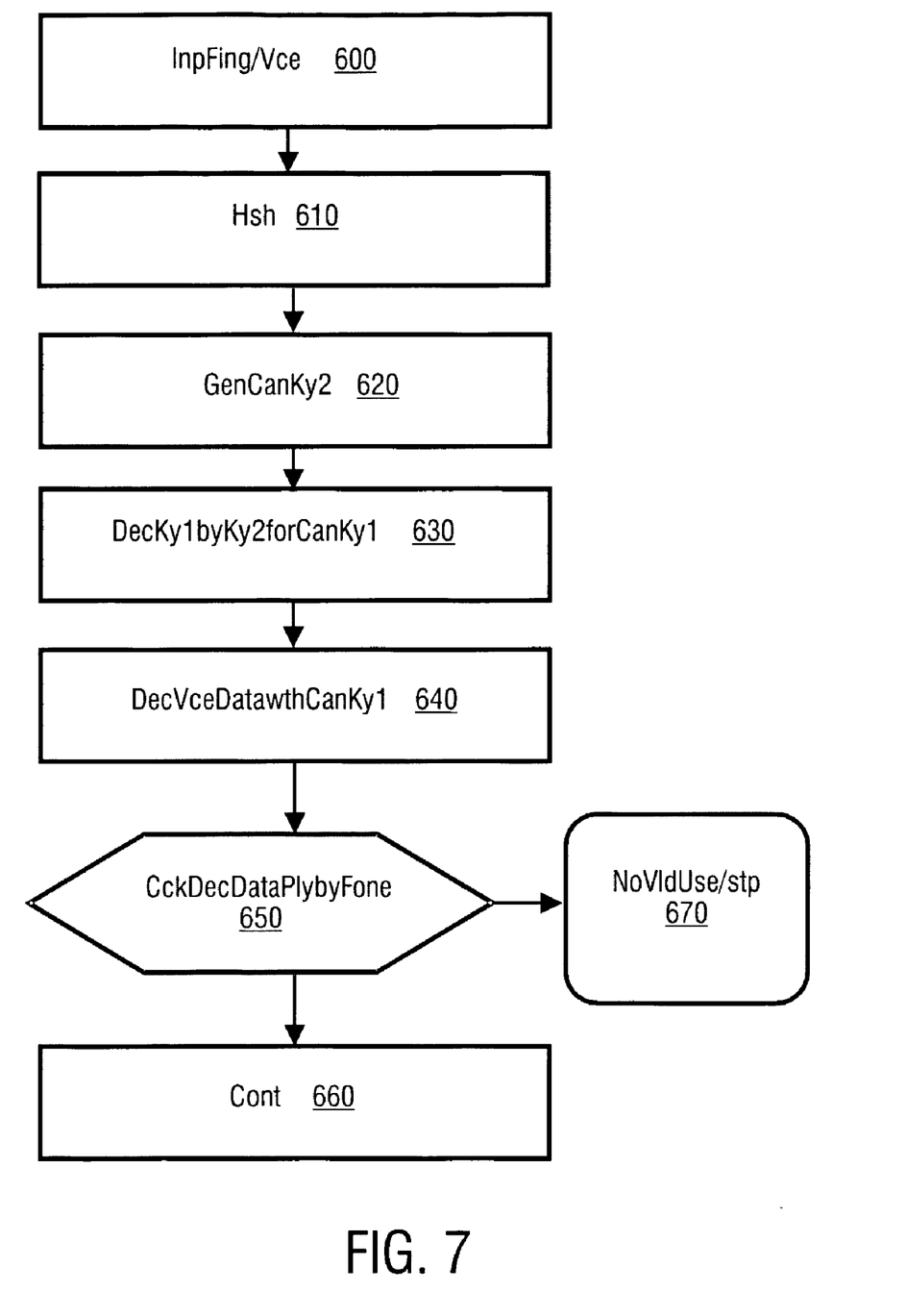
FIG. 7 is a flow chart of steps executable to decrypt an encrypted voice recording using biometric parameters in the apparatus of FIG. 1.

Moreover, FIG. 7 shows a flow chart of a method of retrieving a conversation recorded within the apparatus 10. Mnemonics employed in FIG. 7 have the same meanings as in Table 3.

TABLE 3

| Step | Mnemonic | Interpretation |
| --- | --- | --- |
| 600 | InpFing/Vce | Input Fingerprint/Voice "fingerprint" |
| 610 | Hsh | Hash function |
| 620 | GenCanKy2 | Generate candidate key Key 2 |
| 630 | DecKy1byKy2forCanKy1 | Decrypt encrypted Key 1 (ENCKY) using Key 2 (BIOKY) for generating candidate Key 1 |
| 640 | DecVceDatawthCanKy1 | Decode voice data stored in the memory (MEM) 30 using the candidate decryption Key 1 to generate decrypted data |
| 650 | CckDecDataPlybyFone | Check whether or not the decrypted data can be played on the apparatus 10 |

TABLE 3-continued

| Step | Mnemonic | Interpretation |
| --- | --- | --- |
| 660 | Cont | Continue |
| 670 | NoVldUse/stp | Not a valid user, stop |

In FIG. 7, biometric parameters are measured in a step 600 and then processed by a hash function in a step 610 to generate a candidate Key 2, namely a candidate biometric key (BIOKY), in a step 620. Subsequently, in a step 630, the processing unit (DPU) 20 attempts to apply the candidate Key 2 to decrypt the encrypted Key 1 (ENCKY) to generate a corresponding candidate Key 1 (candidate RANKY). Thereafter, in a step 640, the processing unit (DPU) 20 attempts to decode encrypted voice data stored in the memory (MEM) 30 using the candidate Key 1. The apparatus 10 checks, in a step 650, at the processing unit (DPU) 20 that the voice data is susceptible to being decrypted, using the candidate Key 1. If the decryption of the data is unsuccessful, the apparatus 10 interprets this as incorrect biometric data gathered in the step 600, for example, an unauthorized third party trying to gain access to the data. In such a situation, the processor unit (DPU) 20 proceeds to a step 670. Conversely, if the data can be successfully decoded, using the candidate Key 1, the processing unit (DPU) 20 continues its data decoding operation in step 640 until a desired portion of the data has been decoded.

Numerals and symbols within parentheses in the accompanying claims are solely intended to aid understanding of the claims and are not intended in any way to affect their scope.

It will be appreciated that embodiments of the invention described in the foregoing can be modified without departing from the scope of the invention as defined by the accompanying claims.

The use of verbs such as "comprise", "include", "incorporate", "contain", "be" and "have" and their conjugations is to be construed in a non-exclusive manner when interpreting the description and its associated claims, namely to allow presence of other items or components which are not explicitly defined. Reference to singular use is also to be construed to be reference to plural use, and vice versa.

'Software executable' is to be understood to mean any software product stored on a computer-readable medium, such as a floppy disk, downloadable via a network, such as the Internet, or marketable in any other manner.

The invention claimed is:

1. A personal communication apparatus for generating a verifiable recording of a transaction, the transaction comprising an exchange of information, the apparatus comprising:
a receiving component for receiving a transaction between a user of the apparatus and a remote person, and for receiving biometric data of the remote person;
a protection component for protecting the transaction with the biometric data;
a memory for storing the protected transaction; and
a recording component for recording the protected transaction on the memory,
wherein said recording in the memory is used as a transaction seed for generating an access key;
wherein the protection component protects the transaction with the biometric data by generating one or more access keys (RANKY), encrypting the transaction with the one or more access keys (RANKY), protecting the one or more access keys with the biometric data, and storing the protected one or more access keys in the memory; and
wherein the protection component uses a biometric key (BIOKY) to generate one or more security keys (ENCKY) for use in accessing the protected transaction, the biometric key (BIOKY) corresponding to or being generated from the biometric data.

2. The personal communication apparatus as claimed in claim 1, wherein the memory comprises a keylocker and the protection component stores the protected one or more access keys in the memory by storing the one or more access keys (RANKY) together with the biometric data in the keylocker.

3. The personal communication apparatus as claimed in claim 1, wherein the receiving component receives biometric data from a biometric measuring means which includes one or more from: fingerprint imaging of one or more digits of a human hand, analysis of phonetic content of a vocal utterance, facial imaging followed by image analysis, human iris image analysis, dental imaging, or ear contour analysis.

4. The personal communication apparatus as claimed in claim 1, wherein subsequent transactions are protected by dynamically altered protection components.

5. A personal communication apparatus operable to support authentication of a transaction therein, the transaction comprising an exchange of information, characterized in that the apparatus comprises:
a) a memory for storing a protected transaction with earlier biometric data, wherein the transaction is stored as a recording in the memory; and
b) an authentication component for providing access to the protected transaction if biometric data measured by a biometric measuring means corresponds to the earlier biometric data,
wherein said recording in the memory is used as a transaction seed for generating an access key;
wherein the authentication component provides one or more access keys (RANKY) for decrypting the protected transaction, provided that the biometric data correspond to the earlier biometric data, and further including a decrypting component for using the one or more access keys (RANKY) to decrypt at least part of the protected transaction; and
wherein the authentication component obtains the one or more verified access keys (RANKY) by decrypting one or more security keys (ENCKY) with one or more measured biometric keys (BIOKY).

6. The personal communication apparatus as claimed in claim 5, wherein the one or more access keys are maintained in a keylocker associated therewith with earlier biometric data, such that presentation of the measured biometric data to the keylocker enables access, subject to the earlier biometric data in the keylocker corresponding to the measured biometric data, to the one or more access keys (RANKY).

7. The personal communication apparatus as claimed in claim 5, wherein the authentication component receives biometric data from a biometric measuring means which includes one or more from: fingerprint imaging of one or more digits of a human hand, analysis of phonetic content of a vocal utterance, facial imaging followed by image analysis, human iris image analysis, dental imaging, or ear contour analysis.

8. The personal communication apparatus as claimed in claim 5, wherein subsequent transactions are protected by dynamically altered protection components.

* * * * *